Dec. 12, 1933.     O. SMITH     1,938,643
TEMPERATURE TAKING APPARATUS
Filed Oct. 30, 1931
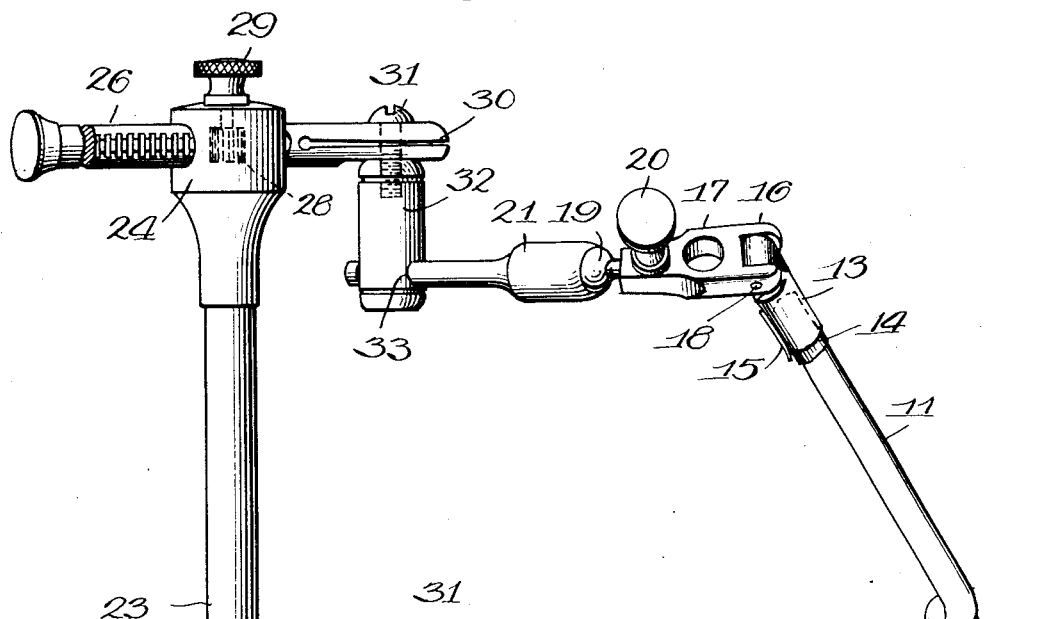
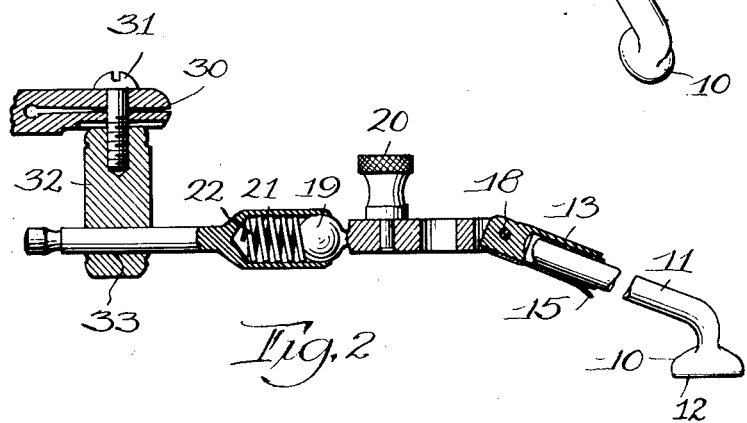
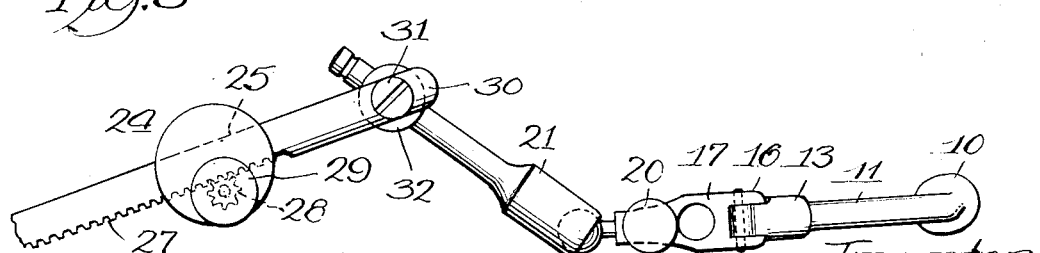
Inventor
Oakley Smith Patented Dec. 12, 1933

1,938,643

UNITED STATES PATENT OFFICE 1,938,643

TEMPERATURE TAKING APPARATUS

Oakley Smith, Chicago, Ill.

Application October 30, 1931. Serial No. 571,988

1 Claim. (Cl. 248—1)

My present invention relates to the provision of temperature taking apparatus, and, more particularly, to an apparatus for taking the skin or surface temperature of restricted areas for diagnostic and prognostic purposes.

It has long been recognized that subcutaneous abnormalities, when they are of a pathologic character, are usually characterized by or produce an anemic or hyperemic condition which causes the adjacent tissue to have a temperature either higher or lower than the normal tissues not involved in the pathologic area.

Thermometers employed for taking skin or surface temperatures are preferably formed with a bulb having an enlarged flat or slightly curvalinear surface for application to the skin. These thermometers have to be applied to the place the temperature of which is to be taken for not less, generally, than two and one-half minutes, and to take the temperature of areas suitable for comparison with each other, the entire application area of the thermometer should be brought in contact with the tissue under substantially the same pressure for each area.

The surface of the body is undulatory in character, and it has been my object to provide facilities whereby the application of the contact area of a skin or surface thermometer can be caused to register with the undulatory surface of the body at a substantially uniform pressure.

I have attained the foregoing objects by means of the mechanism illustrated in the accompanying drawing, in which—

Fig. 1 is a perspective of an embodiment of my invention.

Fig. 2 is a fragmental detail, partially in section, of the elements for securing registry and uniform contact between the contact area of a thermometer and the surface under investigation; and Fig. 3 is a plan of the structure shown in Fig. 1.

The style of surface thermometer which I prefer to employ with my apparatus has the neck of the flattened bulb 10 bent at a right angle to the stem 11 of the thermometer so as to bring the contact surface 12 substantially parallel with the stem. I have found that no great pressure is necessary for securing suitable contact with the surface to be investigated as the contact area of the thermometer is made very thin to facilitate the transmission of heat, providing that the contact surface of the thermometer is brought squarely in contact with the surface to be investigated, and that this degree of pressure is provided by the weight of the thermometer and the part to which it is secured. The immediate part to which the thermometer is secured, designated by the reference character 13, is tubular, into the bore of which, with or without a packing 14, the end of the thermometer is inserted. One side of the tubular member 13 is cut away to disclose the interior bore and opposite the cut away portion is secured a spring blade 15 to assist in holding the thermometer. The opposite end of the member 13, from that in which the thermometer is inserted, is provided with parallel sides which enter between parallel plates 16 of a member 17. The end of the member 13 is secured between the plates 16 by a pin or pintle 18, which gives the thermometer and the member 13 a pivotal movement in substantially a single plane. The joint between the members 13 and 17 is made with as little friction as possible so that the thermometer and the member 13 may gravitate freely about the pintle 18. The end of the member 17 opposite to that provided with the plates 16 is provided with a ball 19, and a knurled stub 20 is also provided upon the member 17 to facilitate grasping and adjusting the same with the fingers. The ball 19 enters a cylindric cavity in a member 21, the outer edges whereof are swaged or upset to prevent the withdrawal of the ball 19 and a spring 22 inserted in the cavity behind the ball 19 develops sufficient friction between the ball 19 and the member 21 to retain the element 17 and the parts associated therewith in any position in which it may be placed.

The structure heretofore described, when the member 20 is held in a suitable standard, will permit the contact portion of the thermometer to be brought into registry with any of the areas of the body with a pressure which is substantially equal to one-half of the weight of the thermometer and the member 13. I have, however, provided a standard for holding the member 21, which facilitates the making of applications and enlarges the range of locations to which applications can be readily made. This standard consists of a column 23 which may be mounted upon or secured to a suitable base, and upon the top of the column 23 is a cap or capital 24 having running transversely therethrough a bore 25 through which passes a rod 26, one edge whereof is flattened and upon which flattened edge is provided a rack 27. A cavity is provided in the head 24 at one side of the bore 25 into which is inserted a gear 28 engaging the rack 27. A pin fixed to the gear passes up through the top of the head 24 and has provided thereon a knurled head 29 by means of which an even and accurately controlled movement of the rod 26 may be secured. The inner end of the rod 26 is split, as at 30, to provide a slight tension and a screw 31 passes down through the parts opposite the split into engagement with a cylindrical piece 32 which is bored, as at 33, to receive the reduced end of the member 21. By means of the slightly resilient or spring connection between the rod 26 and the cylinder 32 a large range of circular adjustments in a horizontal plane may be secured.

With the apparatus above described the contact area of a thermometer may be brought into registry and contact with any portion of the surface of the body lying uppermost, no matter how undulatory its character, and maintained in such registry and contact with a substantially uniform pressure sufficient and for such length of time as may be necessary to secure an accurate temperature determination.

Having described my invention what I claim as new and desire to secure by Letters Patent is:

A support for a thermometer comprising an element arranged to receive and hold the end of a thermometer, a second element with which said first element is pivoted so as to permit gravitation in a single plane, and a third element between which and said second element is provided a frictionally maintained ball and socket connection, a member rotatable upon a vertical axis for supporting said third element in a horizontal position, a rod to which said rotatable member is secured, a standard with which said rod cooperates and means for moving said rod transversely of said standard.

OAKLEY SMITH.